United States Patent
Iyer et al.

(10) Patent No.: US 8,621,408 B2
(45) Date of Patent: Dec. 31, 2013

(54) PROGRESSIVE CIRCUIT EVALUATION FOR CIRCUIT OPTIMIZATION

(75) Inventors: Mahesh A. Iyer, Fremont, CA (US); Robert Walker, Boulder, CO (US); Sudipto Kundu, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/438,602

(22) Filed: Apr. 3, 2012

(65) Prior Publication Data

US 2013/0145336 A1  Jun. 6, 2013

Related U.S. Application Data

(60) Provisional application No. 61/566,469, filed on Dec. 2, 2011.

(51) Int. Cl.
*G06F 17/50* (2006.01)
(52) U.S. Cl.
USPC .......................................... 716/113; 716/134
(58) Field of Classification Search
None
See application file for complete search history.

(56) References Cited

U.S. PATENT DOCUMENTS

| | | | | |
|---|---|---|---|---|
| 5,764,525 A | * | 6/1998 | Mahmood et al. | 716/104 |
| 6,523,156 B2 | * | 2/2003 | Cirit | 716/113 |
| 6,745,371 B2 | * | 6/2004 | Konstadinidis et al. | 716/113 |
| 7,039,881 B2 | * | 5/2006 | Regan | 716/103 |
| 7,448,009 B2 | * | 11/2008 | Pundoor | 716/133 |
| 7,594,202 B2 | * | 9/2009 | de Dood et al. | 716/132 |
| 7,594,203 B2 | * | 9/2009 | de Dood et al. | 716/132 |
| 7,653,885 B2 | * | 1/2010 | Nandy et al. | 716/133 |
| 7,818,695 B2 | * | 10/2010 | Byrn et al. | 716/103 |
| 7,930,674 B2 | * | 4/2011 | Parker et al. | 716/134 |
| 8,332,802 B2 | * | 12/2012 | Haugestuen et al. | 716/134 |
| 2003/0084418 A1 | * | 5/2003 | Regan | 716/14 |
| 2010/0070933 A1 | * | 3/2010 | Quach | 716/2 |
| 2012/0066658 A1 | * | 3/2012 | Chowdhury et al. | 716/120 |

\* cited by examiner

*Primary Examiner* — Leigh Garbowski
(74) *Attorney, Agent, or Firm* — Park, Vaughan, Fleming & Dowler LLP; Laxman Sahasrabuddhe

(57) ABSTRACT

Systems and techniques for optimizing a circuit design are described. Some embodiments reduce the number of gates in the library (e.g., by dynamically pruning the library) which are considered for optimization. Some embodiments create a linear delay model, and use the linear delay model instead of a non-linear delay model to substantially reduce the amount of computation required to check whether or not a particular replacement gate improves one or more metrics of the circuit design. Some embodiments determine an order for processing the gates in the library or for processing input pins of a gate to facilitate early rejection of a candidate gate in the library of gates. In some embodiments, the evaluation of the impact of a candidate gate transformation is done progressively and level-by-level only up to the point where the gate transformation degrades one or more metrics.

18 Claims, 7 Drawing Sheets

PROGRESSIVE CIRCUIT EVALUATION FOR CIRCUIT OPTIMIZATION

RELATED APPLICATION

This application claims priority to U.S. Provisional Application No. 61/566,469, entitled "Progressive circuit evaluation for circuit optimization," by the same inventors, filed 2 Dec. 2011, the contents of which are herein incorporated by reference.

BACKGROUND

1. Technical Field

This disclosure relates to electronic design automation (EDA). More specifically, this disclosure relates to progressive circuit evaluation for circuit optimization.

2. Related Art

Circuit optimization can be performed during logic synthesis and/or physical synthesis. Some circuit optimization techniques iteratively replace a gate in the circuit design with other gates from a library of gates. Each time the iterative circuit optimization technique replaces a gate with another gate, some optimization techniques perform a timing update of the entire design to check whether or not replacing the gate improved the circuit design.

Updating timing information (e.g., updating arrival and required times) for the entire circuit is computationally expensive (the worst-case complexity of a full timing update can be exponential with respect to the circuit design's size). As a result, the timing update operation often becomes a runtime bottleneck in circuit optimization. It is desirable to improve performance of circuit optimization.

SUMMARY

Some embodiments described herein improve the performance of circuit optimization, which can be performed at different levels of circuit abstraction. Some embodiments described herein typically start with an initial circuit design (e.g., a logical or physical design). Next, the embodiments identify a gate in the circuit design for optimization depending on the parameters that are desired to be optimized. Once a gate has been identified for optimization, some embodiments perform an iterative optimization loop. In each iteration of the optimization loop, the identified gate is transformed. In some embodiments, transforming a gate involves replacing the gate with another gate from a library of gates. In other embodiments, transforming a gate involves (1) replacing a gate with an equivalent circuit, e.g., replacing a NAND gate with an AND gate followed by an inverter, and then (2) replacing the gates in the equivalent circuit with other gates from a library of gates. The library of gates typically contains a set of equivalent gates that have different area, leakage, and timing characteristics.

Some embodiments reduce the number of gates in the library (e.g., by dynamically pruning the library) which are considered for optimization. This improves performance because fewer gates need to be processed during the optimization loop.

Some embodiments substantially reduce the amount of computation required to check whether or not a particular replacement gate improves one or more metrics of the circuit design. For example, depending on the situation, some embodiments may use a linear delay model to evaluate arrival times and/or transition times instead of using a non-linear delay model which requires more computation.

Some embodiments determine an order for processing the gates in the library and/or for processing input pins of a gate to facilitate early rejection. Some embodiments sort the gates and/or input pins based on one or more criteria, and either select only the top gate and/or input pin in the sorted list for processing or select the top N (which can be a predetermined value or a user configured value) gates and/or input pins in the sorted list for processing, and ignore the remaining gates and/or input pins.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Figure 1:
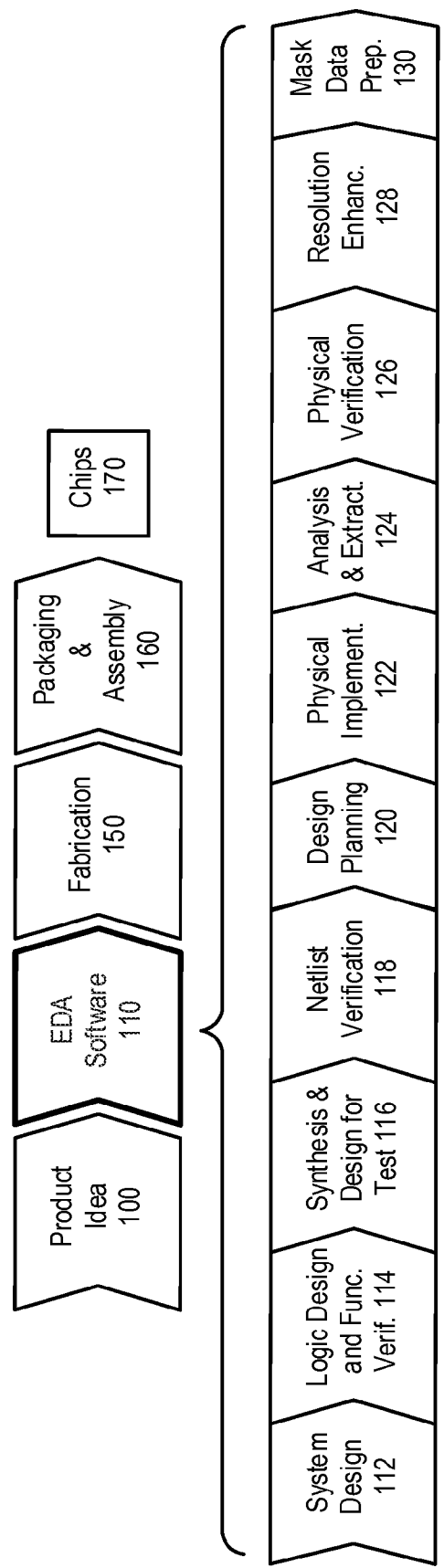
FIG. 1 illustrates various stages in the design and fabrication of an integrated circuit.

FIG. 1 illustrates various stages in the design and fabrication of an integrated circuit.

The process can start with a product idea (step 100) which can be realized using an integrated circuit that is designed using an EDA software (step 80). After the integrated circuit design is finalized, it can undergo a fabrication process (step 150) and a packaging and assembly process (step 160) to produce chips 170.

The EDA process (step 80) comprises steps 82-130, which are described below for illustrative purposes only and are not meant to limit the present invention. Specifically, the steps may be performed in a different sequence than the sequence described below.

During system design (step 82), circuit designers can describe the functionality that they want to implement. They can also perform what-if planning to refine functionality, check costs, etc. Hardware-software architecture partitioning can also occur at this stage. During logic design and functional verification (step 84), the HDL (hardware description language), e.g., SystemVerilog, code for modules in the system can be written and the design can be checked for functional accuracy, e.g., the design can be checked to ensure that it produces the correct outputs.

During synthesis and design for test (step 86), the HDL code can be translated to a netlist. Further, the netlist can be optimized for the target technology, and tests can be designed and implemented to check the finished chips. During netlist verification (step 88), the netlist can be checked for compliance with timing constraints and for correspondence with the HDL code.

During design planning (step 120), an overall floorplan for the chip can be constructed and analyzed for timing and top-level routing. During physical implementation (step 122), circuit elements can be positioned in the layout (placement) and can be electrically coupled (routing).

During analysis and extraction (step 124), the circuit's functionality can be verified at a transistor level and parasitics can be extracted. During physical verification (step 126), the design can be checked to ensure correctness for manufacturing, electrical issues, lithographic issues, and circuitry.

During resolution enhancement (step 128), geometric manipulations can be performed on the layout to improve manufacturability of the design. During mask data preparation (step 130), the design can be "taped-out" to produce masks which are used during fabrication.

Some embodiments described herein can perform circuit optimization at one or more levels of circuit abstraction. Some embodiments described herein typically start with an initial circuit design at a given level of circuit abstraction (e.g., a logical or physical design). Next, a gate is identified in the circuit design for optimization depending on the parameters that are desired to be optimized. For example, a gate that has the worst negative slack, or a gate on the critical path that has the worst transition time, may be identified to optimize timing, a gate that has high leakage power may be identified to optimize leakage power, a gate that has large area may be identified for area recovery, etc. In general, a gate may be identified using a number of criteria. The above-described examples of how a gate can be identified for optimization have been presented for illustration purposes only, and are not intended to limit the disclosed embodiments.

Once a gate has been identified for optimization, some embodiments perform an iterative optimization loop. In each iteration of the optimization loop, the identified gate is transformed. Transforming a gate can involve replacing the gate with another gate from a library of gates, or involve first replacing the gate with an equivalent circuit, and then optionally replacing the gates in the equivalent circuit with other gates from the library of gates. The library of gates typically contains a set of equivalent gates that have different characteristics, e.g., different areas, power leakages, delays, etc. The terms "sizing the gate" and "optimizing the gate" are equivalent terms that refer to the process of replacing a gate that is being optimized with another gate from the library of gates with the goal of improving one or more performance metrics.

When the gate is replaced with another gate from the library, the optimization technique checks if the replacement improves the circuit design. According to one definition, a circuit design is improved if one or more metrics for the circuit design are improved without creating new violations. For example, if the replacement decreases the area or the leakage of the circuit design, but does not create new timing violations or worsen existing timing violations, then the replacement can be considered to have improved the circuit design.

If a gate does not improve one or more metrics for the circuit design, the gate is rejected. On the other hand, if a gate is found that improves one or more metrics, the optimization technique can commit the change to the circuit design, and can use the modified circuit design thereafter. If multiple gates are found to improve the circuit design, then the optimization process can select the best gate out of the multiple gates, and commit the best gate in the circuit design. The circuit design is iteratively improved in this manner until a termination condition (e.g., a time limit, or an absence of any or significant improvement over a given time period) is reached.

Some embodiments described herein improve the performance of the optimization process (especially the iterative optimization loop that iteratively replaces the gate that is being optimized with other gates from the library) in three ways.

First, some embodiments reduce the number of gates in the library (e.g., by dynamically pruning the library) which are considered for optimization. This improves performance because fewer gates need to be processed during the optimization loop.

Second, some embodiments substantially reduce the amount of computation required to check whether or not a particular replacement gate improves one or more metrics of the circuit design. For example, depending on the situation, some embodiments may use a linear delay model to evaluate arrival times and/or transition times instead of using a non-linear delay model which requires more computation.

Third, some embodiments determine an order for processing the gates in the library and/or for processing input pins of a gate to facilitate early rejection. For example, instead of processing the gates and/or the input pins in a random order, some embodiments sort the gates and/or input pins based on one or more criteria to facilitate early rejections, and process the gates and/or input pins in the sorted order. Some embodiments may either select only the first gate and/or input pin in the sorted order for processing or select the top N (which can be a predetermined value or a user configured value) gates and/or input pins in the sorted order for processing, and not consider the remaining gates and/or input pins at all.

Fourth, some embodiments evaluate the impact of a gate transformation in a dynamic and progressive fashion. In other words, these embodiments do not evaluate the entire design (for example, by propagating timing information to the endpoints of the design) to determine whether or not a gate transformation should be accepted or rejected. Instead, in these embodiments, the evaluation of the impact of a candidate transformation is performed progressively and level-by-level only up to the point where the transformation degrades one or more metrics. As soon as degradation of one or more metrics is detected, the evaluation is terminated, and the candidate transformation is rejected. If the evaluation completes without degrading any metrics, then the transformation can be accepted. Furthermore, this progressive evaluation does not create a partitioned circuit (i.e., a portion of the circuit that includes gates in the neighborhood of the gate being optimized), and is done natively using the same timing verifier that is used to verify timing constraints in the entire circuit design.

The following paragraphs describe a number of techniques for improving the performance of the optimization process.

Embodiments described herein may use some or all of these techniques. The techniques described below are for illustration purposes only, and are not intended to limit the embodiments to the forms disclosed. Accordingly, many modifications and variations will be apparent to practitioners skilled in the art.

When a gate is optimized, there are at least three evaluation regions that need to be considered: the fan-outs of the gate, the fan-ins of the gate, and the fan-outs of the fan-ins of the gate. The phrase "fan-outs of a gate" refers to downstream (i.e., "downstream" with respect to signal propagation) gates whose inputs are electrically connected to an output of the gate that is being optimized. The phrase "fan-ins of a gate" refers to upstream (i.e., "upstream" with respect to signal propagation) gates whose outputs are electrically connected to an input of the gate that is being optimized.

Figure 2:
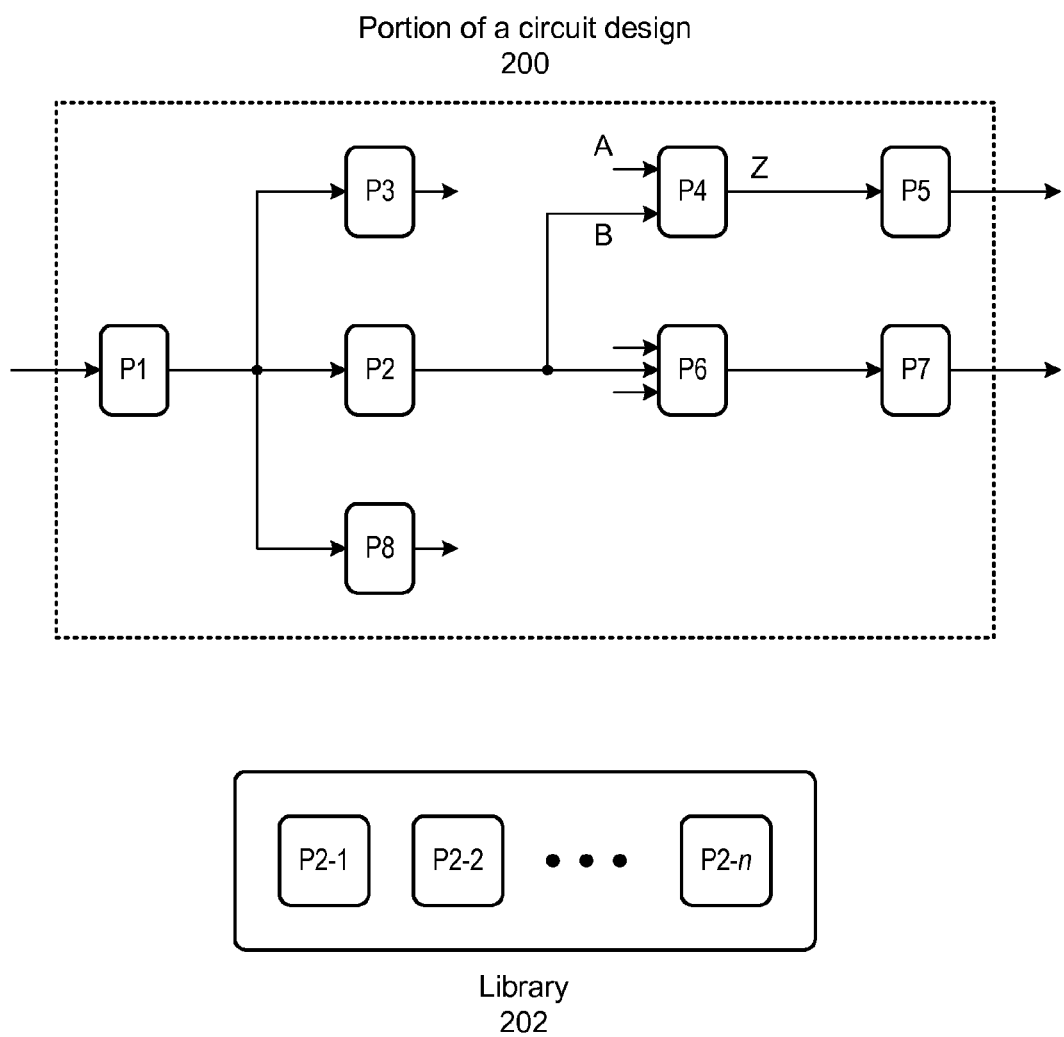
FIG. 2 illustrates a portion of a circuit design that includes a gate that is to be optimized in accordance with some embodiments described herein.

FIG. 2 illustrates a portion of a circuit design that includes a gate that is to be optimized in accordance with some embodiments described herein.

Let us assume that gates P1-P8 are in a portion of a circuit design 200. Without loss of generality, let us assume that gate P2 is to be optimized (e.g., by replacing the gate with a different sized gate to improve one or more metrics of the circuit design). For example, library 202 includes gates P2-1 through P2-$n$ that are functionally equivalent to gate P2, but which have different characteristics, e.g., different delay behaviors, different input pin capacitances, power leakages, areas, etc. During the optimization process, gate P2 is replaced by a gate from library 202 if the replacement improves one or more metrics of the circuit design. Gate P1 is the fan-in gate of gate P2. Gates P4 and P6 are the fan-out gates of gate P2. Gates P3 and P8 are the fan-outs of the fan-ins of gate P2.

Changing the size of P2 (e.g., by replacing gate P2 with gate from library 202) changes the delay and output transition of P2, which changes the arrival times and transition times at the corresponding input pins of the fan-out gates P4 and P6. Changing the size of P2 also changes the delay and output transition of the fan-in gate P1 because of the change in the capacitive load seen by gate P1. This, in turn, could change the arrival times and output transition times of the fan-outs of the fan-ins, namely gates P3 and P8.

Generally speaking, increasing the size of P2 improves the delay and output transitions of P2, but degrades the delays and output transitions of P1, P3, and P8. Some embodiments described herein use the input capacitance of a gate in the library to determine whether or not the gate will degrade the delay and output transition. For example, suppose replacing gate P2 with gate P2-$k$ from library 202 degrades the output arrival time on P3, P2, or P8. Without loss of generality, let us assume that any gate that degrades the output arrival time on P3, P2, or P8 is to be rejected (e.g., because degrading the output arrival time on P3, P2, or P8 either creates a new timing violation or worsens an existing timing violation). Suppose gate P2-$k$ has input capacitance C_k. Then, replacing gate P2 with another gate from library 202 whose input capacitance is greater than C_k will also degrade the output arrival time on P3, P2, or P8. Therefore, in this situation, gates in library 202 whose input capacitances are greater than C_k are not evaluated at all because it is known that these gates will be rejected.

In another example, the arrival times and output transitions of some of P3, P2 and P8 may improve, whereas others may degrade. In such situations, some embodiments can use the notion of a local total negative slack (which is the summation of slacks at the outputs of P3, P2 and P8) to decide whether or not a gate from the library of gates should be evaluated any further.

Some embodiments described herein keep track of a capacitance threshold such that any gate whose input capacitance is greater than the capacitance threshold is known to degrade delay and output transition. These embodiments reject gates very quickly during the optimization by comparing the input capacitance of the gate with the current value of the capacitance threshold.

When timing information (e.g., arrival time and/or transition time) is updated at an output of a gate, the updated timing information can be propagated forward to the inputs of the fan-out gates, which, in turn, can propagate the updated timing information to the fan-out gates of the fan-out gates, and so forth, until the updated timing information reaches the timing endpoints. Timing endpoints are points in the circuit design beyond which timing information is not updated. Typically, a timing endpoint is an input of a sequential element or a primary output of the circuit design.

The phrase "fan-out cone of a gate" refers to the set of gates that are in one or more paths from the outputs of the gate to the timing endpoints. For example, in FIG. 2, gates P4-P7 belong to the fan-out cone of gate P2 (if the circuit design extends beyond gates P5 and P7, then those gates will also be part of the fan-out cone of gate P2).

When a gate is replaced by another gate from a library, the timing information (e.g., the arrival times and/or transition times) can potentially be propagated through the entire fan-out cone of a gate. Note that some embodiments described herein avoid propagating the timing information whenever possible to improve performance.

The slack value at a pin of a gate is equal to the difference between the arrival time and the required time. A slack value greater than zero indicates that the associated timing constraint is being met, whereas a slack value that is less than zero indicates that the associated timing constraint is being violated.

When the timing information is propagated through the fan-out cone, it may degrade the slack values and/or transition times at one or more gates in the fan-out cone. In such cases, the optimization process may reject the library gate, and the optimization process may try another gate from the library.

In some embodiments described herein, if a gate in the library is rejected because the gate degraded the slack and/or output transition somewhere in the fan-out cone (e.g., gates P4, P5, P6, or P7), the timing tuple, (arrival time at the output of P2, output transition time at the output of P2), is saved at the output of P2. For any other alternative gate sizes that are tried, if the arrival time and output transition time at the output of P2 degrades more than the saved tuple, then that gate size is immediately rejected without performing further computations (e.g., without computing the arrival times and output transition times in the fan-out cone).

Gates in the library can be safely rejected this way because the saved tuple represents a threshold that is known to degrade timing. Therefore, a replacement gate that has a worse output arrival and/or output transition time at the output of P2 will be rejected eventually somewhere in the fan-out cone during timing propagation.

Figure 3:
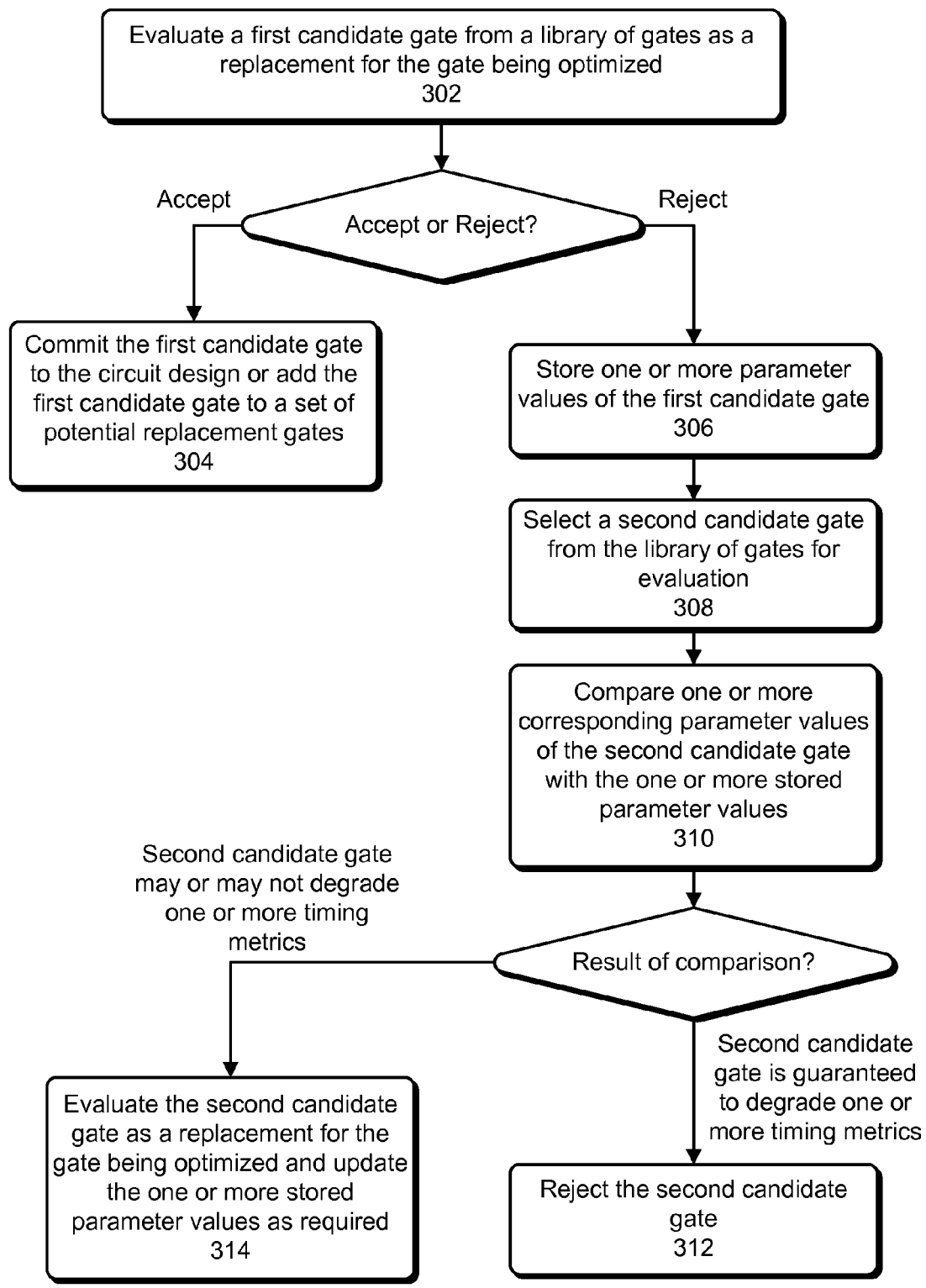
FIG. 3 illustrates a process for using a stored parameter value to reject a gate during optimization in accordance with some embodiments described in this disclosure.

FIG. 3 illustrates a process for using a stored parameter value to reject a gate during optimization in accordance with some embodiments described in this disclosure.

As described above, a gate in the circuit design can be iteratively optimized using a library of gates. During the iterative optimization process, a first candidate gate from a library of candidate gates is evaluated as a replacement for the gate being optimized (operation 302). For example, candidate gate P2-2 in library 202 may be evaluated as a replacement for gate P2.

The words "first," "second," etc. in the terms "first candidate gate," "second candidate gate" etc. refer to different candidate gates in the technology library that correspond to the library gate of the instance gate being optimized, e.g., candidate gates G1, G2, etc. The words "first," "second," etc. do not necessarily refer to the candidate gates that are selected by the optimization process in the first, second, etc. iterations.

If the first candidate gate is accepted as a replacement, the first candidate gate is committed to the circuit design or the first candidate gate is added to a set of potential replacement gates (operation 304).

For example, if gate P2-2 improves the circuit design, then gate P2 can be replaced by gate P2-2 or gate P2-2 can be added to a set of potential replacement gates, from which a "best" replacement gate can be selected and committed to the design later in the optimization process. In some embodiments, a non-timing metric (e.g., area or leakage power) is used to order the multiple gate sizes for processing. For example, if the non-timing metric is leakage recovery, then the multiple gate sizes that improved the timing metrics are ordered in increasing leakage, and the gate size (among the multiple gate sizes that improved timing metrics) that has the least leakage is committed to the design. Similarly, if the non-timing metric is area recovery, then the multiple gate sizes that improved the timing metrics are ordered in increasing area, and the gate size (among the multiple gate sizes that improved timing metrics) that has the least area is committed to the design.

On the other hand, if the first candidate gate is rejected, one or more parameter values of the first candidate gate are stored (operation 306). For example, if gate P2-2 degrades one or more metrics, then one or more parameter values of gate P2-2 are stored. Specifically, if a timing metric of one of the fan-in gates (e.g., gate P1) or one of the fan-out gates of the fan-in gates (e.g., gates P3 and P8) degrades, then the input capacitance of gate P2-2 is stored. A failure analysis module then guarantees that any other candidate library cell P2-$k$ of cell P2 which has worse input capacitance than P2-2 can be immediately rejected because those sizes will at least cause the same rejection that P2-2 caused. On the other hand, if the timing metric of a gate in a fan-out cone degrades, then the arrival time and the transition time at the output of gate P2-2 are stored. This is because the failure analysis module guarantees that an output arrival and output transition time at the output of P2 that is worse than what is produced by P2-2 is going to get rejected when evaluating the fan-out gates. These examples of parameter values have been provided for illustration purposes only and are not intended to limit the embodiments. In general, any parameter value that can help reject gates quickly can be stored.

Next, a second candidate gate from the library of gates is selected for evaluation (operation 308). For example, gate P2-$n$ may be selected for evaluation.

The optimization process then compares one or more corresponding parameter values of the second candidate gate with the one or more stored parameter values (operation 310). For example, the input capacitance of gate P2-$n$ may be compared with the stored input capacitance value, the arrival time value at the output of P2-$n$ may be compared with the stored arrival time value, and/or the transition time value at the output of P2-$n$ may be compared with the stored transition time value.

Responsive to a result of the comparison, the second candidate gate is either rejected or is evaluated as a replacement for the gate being optimized. Specifically, the second candidate gate is rejected (operation 312) if the result of the comparison indicates that the second candidate gate is guaranteed to degrade one or more timing metrics. On the other hand, if the result of the comparison indicates that the second candidate gate may or may not degrade one or more timing metrics, then the second candidate gate is evaluated as a replacement for the gate being optimized, and the one or more stored parameter values are updated as required (operation 314).

For example, if the comparison indicates that P2-$n$ is guaranteed to degrade one or more timing metrics (e.g., if the input capacitance of P2-$n$ is greater than the stored capacitance value, or if the arrival time and/or transition time at the output of P2-$n$ is greater than the stored arrival time and/or transition time), then gate P2-$n$ can be immediately rejected without performing any further timing computations (e.g., without determining and/or propagating new timing information).

On the other hand, if the comparison indicates that P2-$n$ may or may not degrade one or more timing metrics (e.g., if the input capacitance of P2-$n$ is less than or equal to the stored capacitance value, or if the arrival time and/or transition time at the output of P2-$n$ is less than or equal to the stored arrival time and/or transition time), then gate P2-$n$ can be evaluated further, e.g., by determining and/or propagating new timing information. During this evaluation, if gate P2-$n$ is rejected, then the one or more stored parameter values can be updated as required (e.g., a new input capacitance, arrival time, and/or transition time value can be stored if the new value is lower than the currently stored value).

When the impact on the delay and transition times is evaluated for a sized gate, an embodiment may evaluate almost all input-output arcs of the gate that is being sized. In some embodiments, the input-output arcs are sorted based on criticality to enable gates to be rejected early. In some embodiments, the input pins with the following characteristics are identified: (1) worst rise slack, (2) worst fall slack, and (3) worst input transition. In some cases a single input pin may have the worst rise slack, the worst fall slack, and the worst input transition. In these cases, the slacks and transition time for the arc between this input pin and the output pin is evaluated first to quickly reject gates that worsen the slack or transition time for this arc.

If different input pins have the worst fall, rise, and/or transition time, then the arcs from these pins to the output are evaluated before other arcs. In some embodiments, input pins whose slacks are within a certain threshold of the worst slack are selected for evaluation first. This threshold-based approach can avoid cases in which the second worst input pin (within the criticality threshold) has a worse arc delay than the worst input pin, and contributes to the degradation at the output pin.

In some embodiments, when timing information is propagated in the fan-out cone, the gates in the fan-out cone are processed level-by-level (e.g., the first level is the fan-outs of a gate, the second level is the fan-outs of the fan-outs of the gate, the third level is the fan-outs of the fan-outs of the fan-outs of the gate, and so forth). In each level of the fan-out cone, the gates are processed from the most timing critical gate to the least timing critical gate.

For example, in FIG. 2, the level-by-level processing would begin by sorting the gates in the first fan-out level (e.g., P4 and P6) based on timing criticality. The new timing information is computed for these fan-out gates starting with the most critical gate (i.e., the gate with the least positive slack or the worst negative slack) and proceeding to the least critical gate (i.e., the gate with the highest positive slack or least negative slack). Note that the evaluation point for the timing information is at the outputs of the gate.

For example, suppose in the initial circuit design (i.e., the circuit design with gate P2), the slack at the output of gate P4 is +2 and the slack at the output of gate P6 is +5. If gate P2-1 is evaluated as a potential replacement for gate P2, then the new slack at the output of gate P4 is computed first, and if that slack does not violate a timing requirement, then the slack at the output of gate P6 is computed.

If the evaluation of the timing information concludes that the arrival time or output transition time at the output of a gate has degraded, then the gate size that is being considered is immediately rejected, and the iterative optimization loop proceeds to the next candidate gate (if any) in the library.

Before proceeding to the next candidate gate, some embodiments save the timing tuple, i.e., (arrival time at the output of the fan-out gate where the timing degraded, output transition time at the output of the fan-out gate where the timing degraded), at the output of the fan-out gate where the timing degraded. When the next candidate gate in the library is processed, the evaluated timing information is checked against the stored tuple. If the evaluated timing information is worse than the stored tuple, the gate is immediately rejected. In this manner, some embodiments reject a gate if the computed arrival time or the output transition time is greater than the stored threshold at any point in the circuit design.

Once all of the gates in a fan-out level (e.g., gates P4 and P6) have been processed, the embodiment processes the gates in the next fan-out level (e.g., gates P5 and P7) in a similar fashion. Processing gates level-by-level, and in a sorted order from the most critical gate to the least critical gate enables the optimization process to reject gates quickly, because any increase in output arrival times or output transition times would be found quickly, and would result in a rejection.

Figure 4:
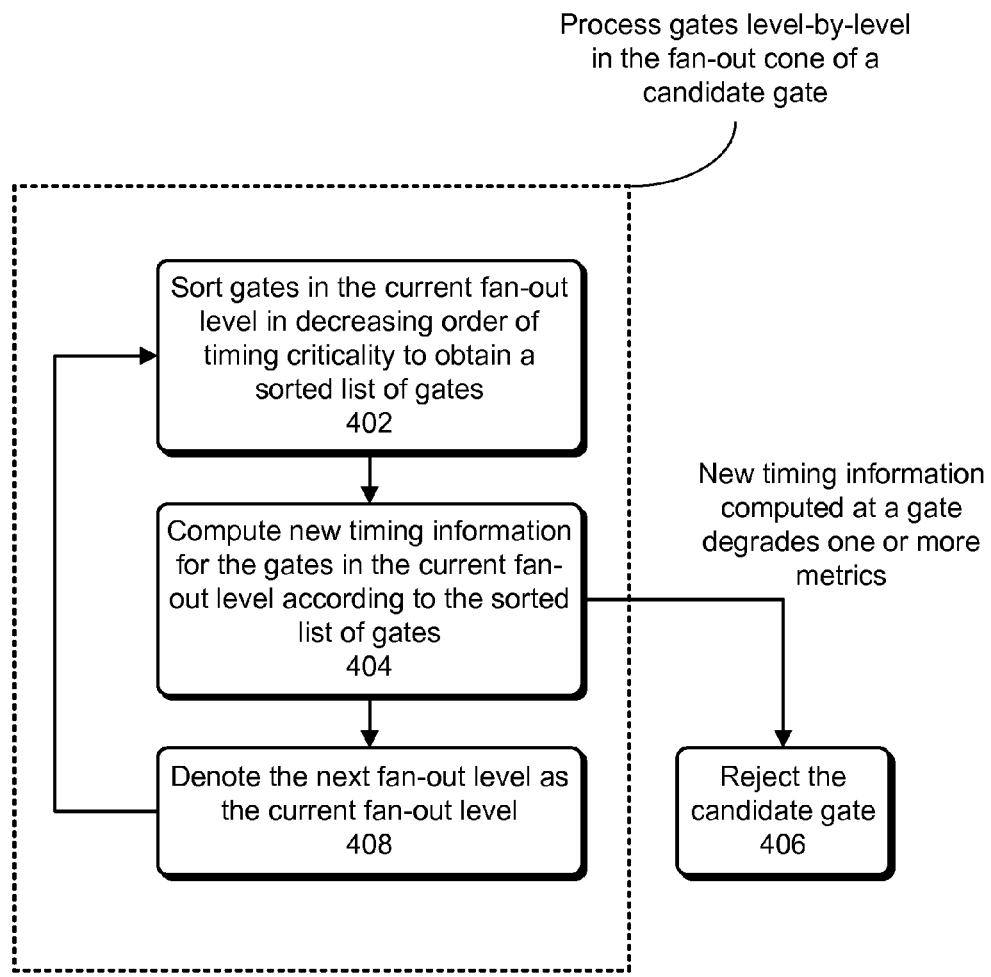
FIG. 4 illustrates a process for computing timing information for gates in the fan-out cone of a candidate gate under evaluation in accordance with some embodiments described herein.

FIG. 4 illustrates a process for computing timing information for gates in the fan-out cone of a candidate gate under evaluation in accordance with some embodiments described herein.

The process begins by sorting gates in the current fan-out level in decreasing order of timing criticality to obtain a sorted list of gates (operation 402). According to one definition, the term "decreasing order of timing criticality" sorts the gates from worst negative slack (or the least positive slack) to the least negative slack (or the most positive slack).

Next, new timing information (e.g., arrival time and transition time) for the gates in the current fan-out level is computed according to the sorted list of gates (operation 404).

If the new timing information for a gate in the current fan-out level degrades one or more metrics, then the candidate gate is rejected (operation 406). Specifically, if the new timing information for a gate creates a new timing violation or worsens an existing timing violation, the new timing information is stored for the gate (and the timing information for corresponding gates in previous fan-out levels may also be stored), and the candidate gate that is being evaluated is rejected. On the other hand, if timing information was previously stored for the gate (e.g., because one or more metrics are known to degrade in a subsequent level of the fan-out cone), then the new timing information is compared with the previously stored timing information. If the new timing information is worse than the previously stored timing information (e.g., if the arrival time and/or transition time are greater than the stored values), then the candidate gate that is being evaluated is rejected.

If the new timing information for the gates in the current fan-out level does not cause the candidate gate to be rejected, then the next fan-out level is denoted as the current fan-out level (operation 408), and the process returns to operation 402.

When a fan-out gate is processed, the relative delays of the input/output arcs can be used to reduce the amount of computation required to determine whether or not timing has degraded. In FIG. 2, let the top input of gate P4 be "A," the bottom input of gate P4 be "B," and the output of gate P4 be "Z."

Let us assume the following timing information for gate P4: slack at input A=−10, slew at input A=0.2, arc delay A→Z=0.5, slack at input B=−8, slew at input B=0.1, and arc delay B→Z=0.3.

After sizing P2 (i.e., after replacing gate P2 with a candidate gate from the library), if the new arrival time and the new transition time at input B is dominated by the arrival and transition times at input A, then the embodiment can skip evaluating the arcs along P2-P4 path, i.e., arc B→Z.

For example, suppose the new arrival time and the new transition time at input B are as follows: slack=−9, slew=0.15. The slack and slew values at input A dominate the new values at input B. If the original arc delay A→Z is worse (i.e., greater in value) than the original arc delay B→Z, then the embodiment can avoid propagating the timing information across arc B→Z, thereby reducing the amount of computation required.

Figure 5:
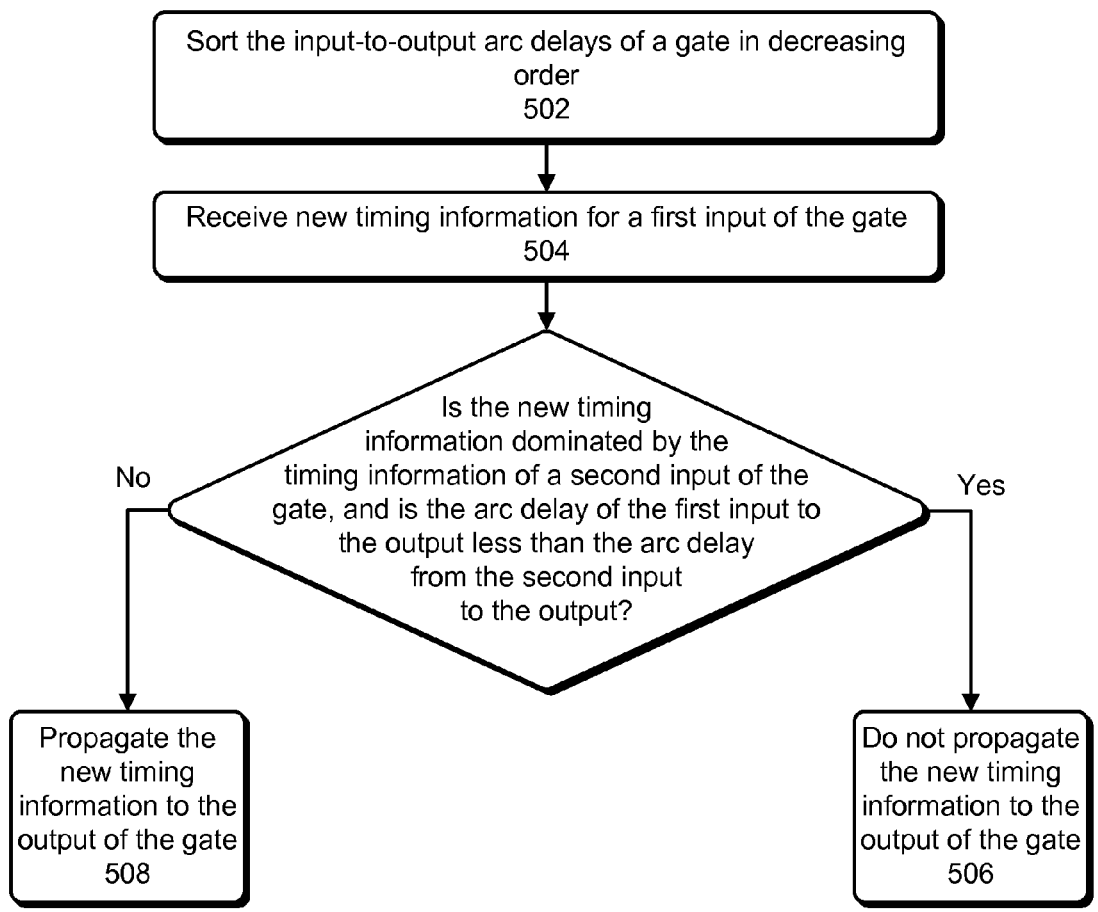
FIG. 5 illustrates a process for improving optimization performance by sorting input/output arc delays of a gate in accordance with some embodiments described herein.

FIG. 5 illustrates a process for improving optimization performance by sorting input/output arc delays of a gate in accordance with some embodiments described herein.

The process can begin by sorting the input-to-output arc delays of a gate in decreasing order (operation 502). Next, new timing information (e.g., arrival time and/or transition time) is received for a first input of the gate (operation 504). If the new timing information at the first input of the gate is dominated by the timing information at a second input of the gate, and if the arc delay from the first input to the output is less than the arc delay from the second input to the output, then the new timing information is not propagated to the output of the gate (operation 506); otherwise, the new timing information is propagated to the output of the gate (operation 508).

According to one definition, timing information at a first pin (e.g., a first input of a gate) is dominated by the timing information at a second pin (e.g., a second input of the gate) if the arrival time and the transition time at the first pin is less than the arrival time and the transition time, respectively, at the second pin.

If the change in input capacitance of the sized cell is small compared to the total capacitance seen at the output of a fan-in gate, then the amount of computation required to determine the new arrival time at the output pin of the fan-in gate can be reduced by using a linear delay model instead of a non-linear delay model.

Suppose gate P1 in FIG. 2 sees a total capacitance C_total contributed by net wire capacitance as well as the pin capacitances from all the fan-out pins of gate P1. Further, suppose the input capacitance of P2 is C2. The capacitance criticality of P2 is defined as the value C_ratio=C2/C_total. If C_ratio is less than a predetermined threshold (C_threshold) then the new arrival time and input transition time at the input pin of P2 can be determined using a linear delay model.

Specifically, a capacitance sensitivity value can be determined for gate P1. According to one definition, capacitance sensitivity of a gate is equal to the change in a given parameter (e.g., arrival time or transition time) at the output of the gate for a unit change in the capacitive load. The capacitance sensitivity can then be used to modulate (e.g., by multiplying the capacitance sensitivity with the change in the input capacitance) the arrival time and transition time based on the change in the input capacitance. A capacitance sensitivity value is one example of a linear delay model.

The linear delay model based approach is accurate when the total capacitive load seen by the fan-in gate is sufficiently high compared to the change in the input capacitance of the gate that is being optimized (e.g., when C_ratio<C_threshold). Typically, the arrival time and transition time are non-linear functions of the capacitive load (the non-linear relationship is typically represented using a non-linear delay model). However, these non-linear functions can be locally approximated using a linear delay model (e.g., a capacitance sensitivity value) when the change in the capacitance value is sufficiently small, e.g., when C_ratio<C_threshold.

Some embodiments improve performance using the following approach. For the input pin that contributes to the worst arrival time on the output of gate P2, the embodiments analyze the input pin capacitances of all the equivalent library cell sizes to determine the minimum (C_min) and maximum (C_max) capacitances. For C_min and C_max, the embodiments compute the new arrival times a_min and a_max, and the new transition times t_min and t_max at the input pin of gate P2. If the difference between the arrival times, i.e., (a_max−a_min), is less than a first threshold, and the difference between the transition times, i.e., (t_max−t_min) is less than a second threshold, then the embodiments compute the arrival times and transition times for the gates during the optimization process using a linear delay model, i.e., the arrival time is assumed to linearly vary from a_min to a_max with respect to the input capacitance varying from C_min to C_max, and the transition time is assumed to linearly vary from t_min to t_max with respect to the input capacitance varying from C_min to C_max.

Specifically, during the optimization process, the arrival time and the transition time at the input of a new gate size is computed using the linear delay model instead of normally evaluating the fan-in gate under the new capacitive load (note that evaluating the fan-in gate under the new capacitive load normally involves using a non-linear delay model, which requires substantially more computation than the above-described linear delay model).

In some embodiments, if the difference between the arrival times and/or transition times is not within their respective thresholds, the embodiments use the linear delay model to prune the library cells. A linear delay model is determined as before, and the new arrival time and new transition time are computed on the input pin for each of the equivalent library sizes. Then, the embodiments use this new arrival time and new transition time on the most critical input pin of P2 and evaluate the critical arc for all equivalent library cells sizes. Next, the embodiments, select the top N library cell sizes that have the best output arrival times and prune all the other library cell sizes. These N library cells are then used for the detailed evaluation during the optimization process.

Figure 6:
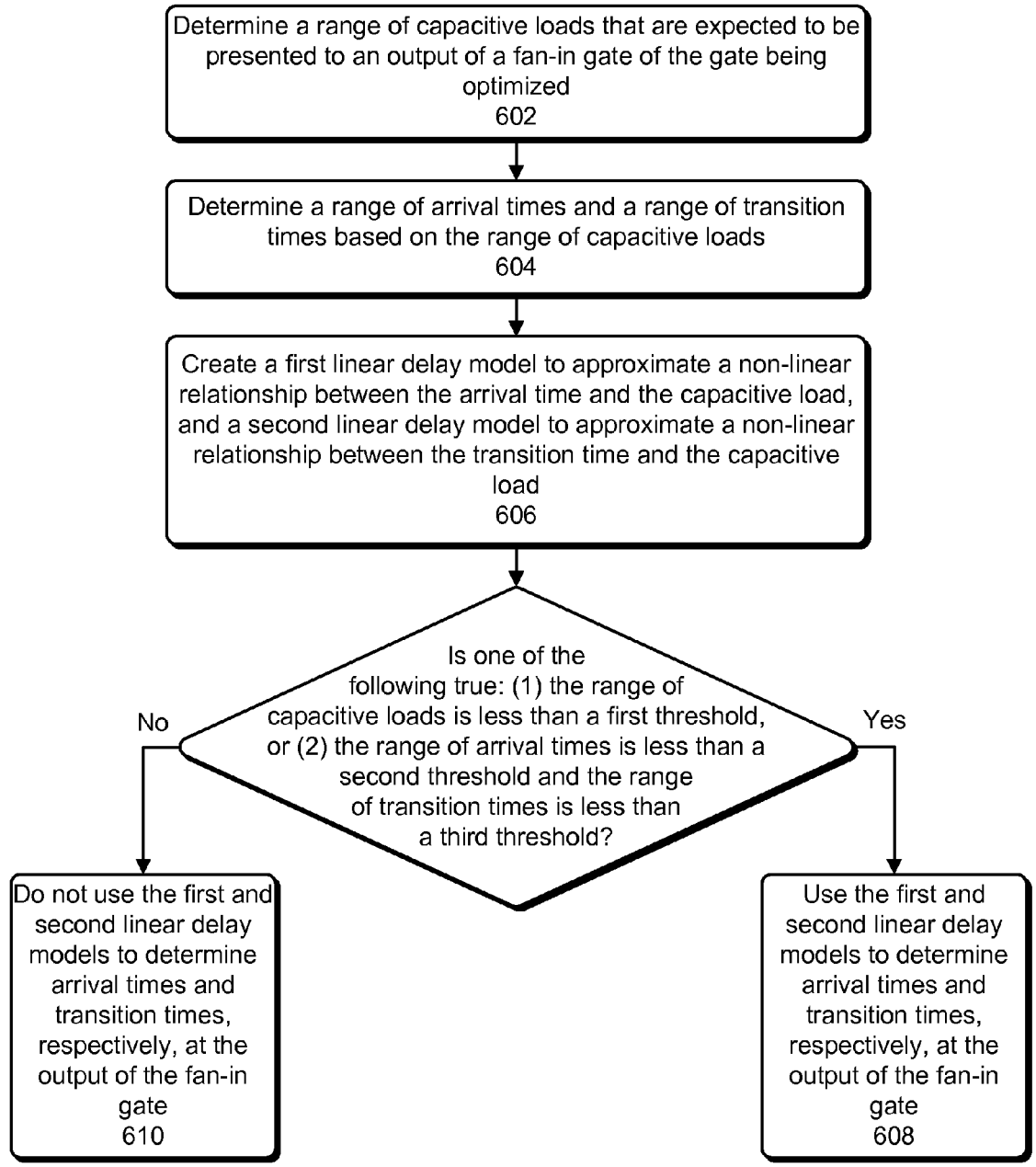
FIG. 6 illustrates a process to use a linear delay model to determine timing information in accordance with some embodiments described herein.

FIG. 6 illustrates a process to use a linear delay model to determine timing information in accordance with some embodiments described herein.

While optimizing a gate using a library of candidate gates, the optimization process can determine a range of capacitive loads that are expected to be presented to an output of a fan-in gate of the gate being optimized (operation 602). As explained above, the arrival time and the transition time at the output of the fan-in gate have a non-linear relationship with respect to the capacitive load presented to the output of the fan-in gate. The range of capacitive loads that are expected to be presented to the output of the fan-in gate can be determined by computing the minimum and maximum capacitance values in the library of gates.

Next, a range of arrival times and a range of transition times can be determined based on the range of capacitive loads (operation 604). The range of arrival times and the range of transitions times can be determined by using a non-linear delay model for the fan-in gate to compute the minimum/maximum arrival times and maximum/minimum transition times corresponding to the maximum/minimum capacitance values.

A first linear delay model can be created to approximate a non-linear relationship between the arrival time and the capacitive load, and a second linear delay model can be created to approximate a non-linear relationship between the transition time and the capacitive load (operation 606).

If (1) the range of capacitive loads is less than a first threshold, or (2) the range of arrival times is less than a second threshold and the range of transition times is less than a third threshold, then the first linear delay model and the second linear delay model are used during the optimization process to determine arrival and transition times, respectively, at the output of the fan-in gate (operation 608).

On the other hand, if the range of capacitive loads is greater than or equal to the first threshold, the range of arrival times is greater than the second threshold, or the range of transition times is greater than the third threshold, then the first linear delay model and the second linear delay model are not used to determine arrival times and transition times, respectively, at the output of the fan-in gate (operation 610). Instead, a different technique may be used to prune the gates in the library.

Figure 7:
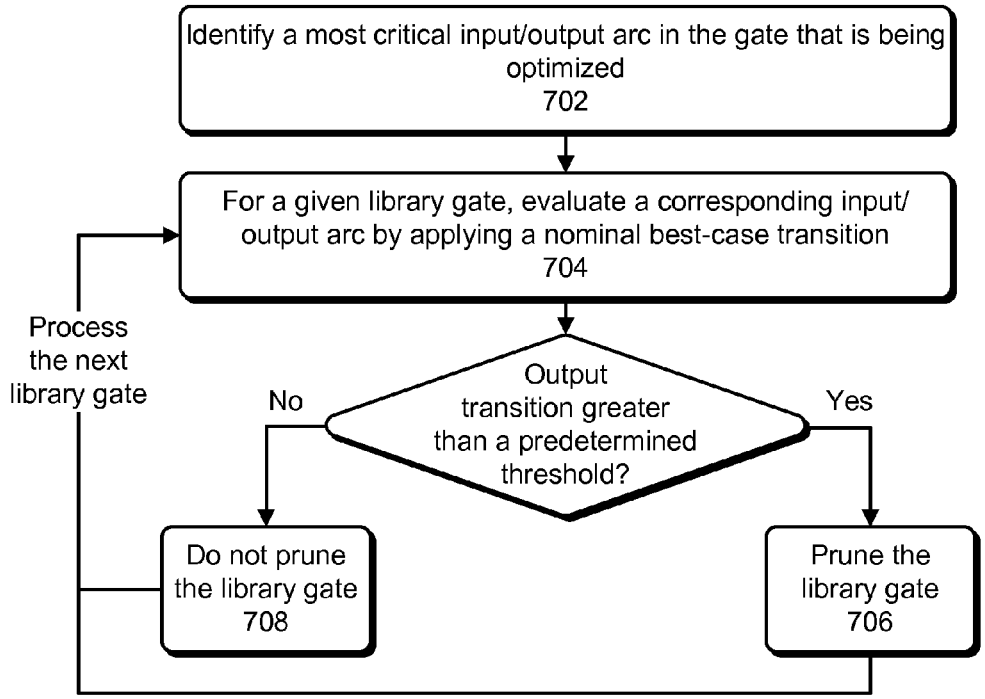
FIG. 7 illustrates a process for pruning gates in a library before an iterative optimization process is performed in accordance with some embodiments described herein.

FIG. 7 illustrates a process for pruning gates in a library before an iterative optimization process is performed in accordance with some embodiments described herein.

The process illustrated in FIG. 7 can be performed for each library gate. For the gate that is being optimized, the most critical input/output arc based on the transition time is identified (operation 702). The most critical input/output arc in operation 702 is the input/output arc that has the largest output transition value. Next, for a given library gate, the corresponding input/output arc is evaluated by applying a nominal best-case transition (operation 704). The term "nominal best-case transition" corresponds to a transition time value for the input/output arc in question under a best-case scenario (e.g., a minimum transition time value for the input/output arc that is expected to occur under normal operating conditions). If the library gate produces an output transition that is greater than a predetermined threshold (e.g., greater than the maximum allowed transition and/or a user-specified maximum transition), then the library gate is pruned (operation 706), i.e., the library gate will not be considered during the iterative sizing process. On the other hand, if the library gate produces an output transition that is less than or equal to the predetermined threshold, then the library gate is not pruned (operation 708). This pruning process is quick and accurate because the process evaluates only one arc for each library gate without triggering any fan-in calculations, and removes only those gates that are clearly bad replacements.

Figure 8:
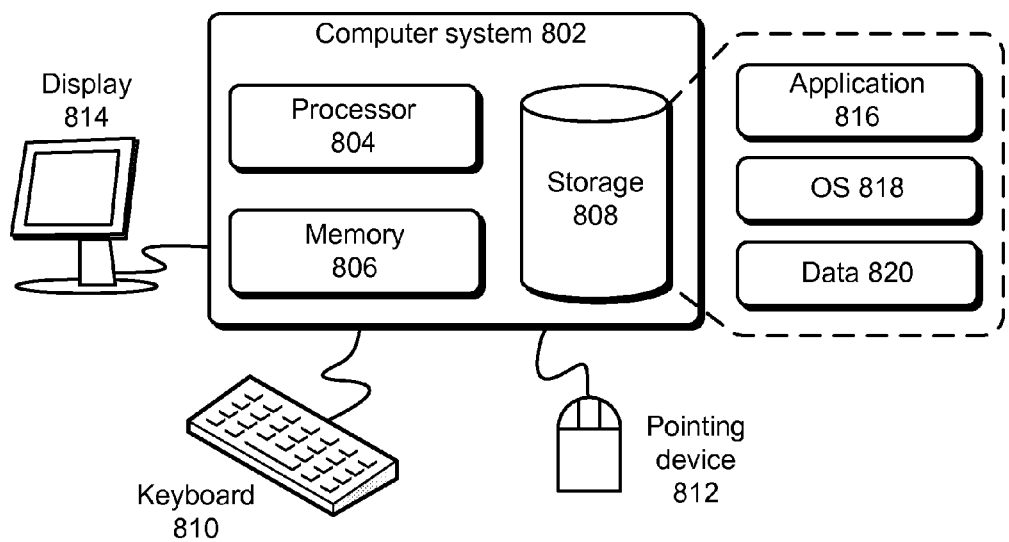
FIG. 8 illustrates a computer system in accordance with an embodiment of the present invention.

FIG. 8 illustrates a computer system in accordance with an embodiment of the present invention.

A computer system can generally be any system that can perform computations. Specifically, a computer system can be a microprocessor, an application specific integrated circuit, a distributed computing system, a cloud computing system, or any other computing system now known or later developed. Computer system 802 comprises processor 804, memory 806, and storage 808. Computer system 802 can be coupled with display 814, keyboard 810, and pointing device 812. Storage 808 can generally be any device that can store data. Specifically, a storage device can be a magnetic, an optical, or a magneto-optical storage device, or it can be based on flash memory and/or battery-backed up memory. Storage 808 can store application 816, operating system 818, and data 820.

Application 816 can include instructions that when executed by computer 802 cause computer 802 to perform one or more processes that are implicitly or explicitly described in this disclosure. Data 820 can include any data that is inputted into or outputted by application 816.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing a circuit design, the method comprising:
   evaluating, by computer, a first candidate gate from a library of gates as a replacement for a gate that is being optimized, wherein said evaluating involves computing one or more timing metrics based on the first candidate gate;
   responsive to rejecting the first candidate gate based on said evaluating, storing one or more parameter values of the first candidate gate;
   determining whether a second candidate gate from the library of gates degrades the one or more timing metrics by comparing one or more corresponding parameter values of the second candidate gate with the one or more stored parameter values, wherein said determining does not involve computing the one or more timing metrics based on the second candidate gate; and
   rejecting the second candidate gate based on said determining.

2. The method of claim 1, wherein the one or more parameter values includes an input capacitance of the first candidate gate, and wherein said rejecting involves rejecting the second candidate gate if an input capacitance of the second candidate gate is greater than the input capacitance of the first candidate gate.

3. The method of claim 1, wherein the one or more parameter values includes an arrival time value at an output of the first candidate gate, and wherein said rejecting involves rejecting the second candidate gate if an arrival time value at an output of the second candidate gate is greater than the arrival time value at the output of the first candidate gate.

4. The method of claim 1, wherein the one or more parameter values includes a transition time value at an output of the first candidate gate, and wherein said rejecting involves rejecting the second candidate gate if a transition time value at an output of the second candidate gate is greater than the transition time value at the output of the first candidate gate.

5. The method of claim 1, wherein said evaluating involves computing timing information for gates level-by-level in a fan-out cone of the first candidate gate, wherein gates in each fan-out level are processed in decreasing order of timing criticality.

6. The method of claim 1, wherein said evaluating includes:
   receiving new timing information for a first input of a first gate in a fan-out cone of the gate that is being optimized;
   performing a first comparison between the new timing information with timing information of a second input of the first gate;
   performing a second comparison between a first arc delay and a second arc delay, wherein the first arc delay is a delay from the first input to an output of the first gate, and the second arc delay is a delay from the second input to the output of the first gate; and
   propagating the new timing information to the output of the first gate based on said first and second comparisons.

7. The method of claim 1, wherein evaluating the first candidate gate includes:
   determining a range of capacitive loads that are expected to be presented to an output of a fan-in gate of the gate that is being optimized;
   determining a range of arrival times and transition times based on the range of capacitive loads;
   creating a first linear delay model to approximate a non-linear relationship between an arrival time and a capacitive load based on the range of arrival times and the range of capacitive loads;
   creating a second linear delay model to approximate a non-linear relationship between a transition time and a capacitive load based on the range of transition times and the range of capacitive loads; and
   responsive to determining that either the range of capacitive loads is less than a first threshold, or the range of arrival times is less than a second threshold and the range of transition times is less than a third threshold, using the first and second linear delay models to determine arrival times and transition times, respectively, at the output of the fan-in gate.

8. The method of claim 1, wherein prior to evaluating the first candidate gate, the method comprises:

identifying a most critical input-to-output arc of the gate that is being optimized; and for each candidate gate in the library of gates, evaluating an input-to-output arc of the candidate gate that corresponds to the most critical input-to-output arc of the gate that is being optimized, wherein said evaluating is based on a nominal best-case transition, and pruning the candidate gate if said evaluating produces an output transition that is greater than a predetermined threshold.

9. A computer system, comprising:

a processor; and a storage medium storing instructions that, when executed by the processor, cause the computer system to perform a method for optimizing a circuit design, the method comprising:

evaluating a first candidate gate from a library of gates as a replacement for a gate that is being optimized, wherein said evaluating involves computing one or more timing metrics based on the first candidate gate;

responsive to rejecting the first candidate gate based on said evaluating, storing one or more parameter values of the first candidate gate;

determining whether a second candidate gate from the library of gates degrades the one or more timing metrics by comparing one or more corresponding parameter values of the second candidate gate with the one or more stored parameter values, wherein said determining does not involve computing the one or more timing metrics based on the second candidate gate; and rejecting the second candidate gate based on said determining.

10. The computer system of claim 9, wherein the one or more parameter values includes an input capacitance of the first candidate gate, and wherein said rejecting involves rejecting the second candidate gate if an input capacitance of the second candidate gate is greater than the input capacitance of the first candidate gate.

11. The computer system of claim 9, wherein the one or more parameter values includes an arrival time value at an output of the first candidate gate, and wherein said rejecting involves rejecting the second candidate gate if an arrival time value at an output of the second candidate gate is greater than the arrival time value at the output of the first candidate gate.

12. The computer system of claim 9, wherein the one or more parameter values includes a transition time value at an output of the first candidate gate, and wherein said rejecting involves rejecting the second candidate gate if a transition time value at an output of the second candidate gate is greater than the transition time value at the output of the first candidate gate.

13. The computer system of claim 9, wherein said evaluating involves computing timing information for gates level-by-level in a fan-out cone of the first candidate gate, wherein gates in each fan-out level are processed in decreasing order of timing criticality.

14. The computer system of claim 9, wherein said evaluating includes:

receiving new timing information for a first input of a first gate in a fan-out cone of the gate that is being optimized;

performing a first comparison between the new timing information with timing information of a second input of the first gate;

performing a second comparison between a first arc delay and a second arc delay, wherein the first arc delay is a delay from the first input to an output of the first gate, and the second arc delay is a delay from the second input to the output of the first gate; and propagating the new timing information to the output of the first gate based on said first and second comparisons.

15. The computer system of claim 9, wherein said evaluating includes:

determining a range of capacitive loads that are expected to be presented to an output of a fan-in gate of the gate that is being optimized;

determining a range of arrival times and transition times based on the range of capacitive loads;

creating a first linear delay model to approximate a non-linear relationship between an arrival time and a capacitive load based on the range of arrival times and the range of capacitive loads;

creating a second linear delay model to approximate a non-linear relationship between a transition time and a capacitive load based on the range of transition times and the range of capacitive loads; and responsive to determining that either the range of capacitive loads is less than a first threshold, or the range of arrival times is less than a second threshold and the range of transition times is less than a third threshold, using the first and second linear delay models to determine arrival times and transition times, respectively, at the output of the fan-in gate.

16. The computer system of claim 9, wherein prior to said evaluating, the method comprises:

identifying a most critical input-to-output arc of the gate that is being optimized; and for each candidate gate in the library of gates, evaluating an input-to-output arc of the candidate gate that corresponds to the most critical input-to-output arc of the gate that is being optimized, wherein said evaluating is based on a nominal best-case transition, and pruning the candidate gate if said evaluating produces an output transition that is greater than a predetermined threshold.

17. A method for optimizing a circuit design, the method comprising:

evaluating, by computer, an impact of replacing a gate that is being optimized with a candidate gate from a library of gates, wherein said evaluating is performed progressively through the circuit design; and terminating said evaluating as soon as a degradation of one or more metrics is detected, wherein for at least one candidate gate, said evaluating does not involve computing the one or more metrics based on the candidate gate.

18. The method of claim 17, wherein said evaluating does not create a partitioned circuit, and wherein said evaluating uses a circuit timing verifier that is used for verifying timing constraints in the circuit design.

* * * * *